United States Patent
Lenny et al.

(10) Patent No.: US 6,650,492 B2
(45) Date of Patent: Nov. 18, 2003

(54) SELF-CONTAINED DISC DRIVE WRITE AUTHENTICATION TEST

(75) Inventors: Thomas Richardson Lenny, Longmont, CO (US); James Arthur Herbst, Longmont, CO (US); Jonathan Williams Haines, Lafayette, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 181 days.

(21) Appl. No.: 09/876,510

(22) Filed: Jun. 7, 2001

(65) Prior Publication Data

US 2002/0036855 A1 Mar. 28, 2002

Related U.S. Application Data

(60) Provisional application No. 60/236,317, filed on Sep. 28, 2000.

(51) Int. Cl.$^7$ ................................................. G11B 27/36
(52) U.S. Cl. ............................... 360/31; 360/53; 360/69
(58) Field of Search ............................. 360/31, 53, 69; 324/210, 212, 226; 714/769, 770; 369/53.12, 53.15, 53.32, 53.33, 47.18, 47.17

(56) References Cited

U.S. PATENT DOCUMENTS

| | | | |
|---|---|---|---|
| 3,860,958 A | 1/1975 | Hanson | |
| 4,296,404 A | 10/1981 | Sheldon | |
| 4,558,380 A | 12/1985 | Porter | |
| 4,578,722 A | 3/1986 | Lovgren et al. | |
| 5,142,422 A | 8/1992 | Zook et al. | |
| 5,142,515 A | 8/1992 | McFerrin et al. | |
| 5,200,959 A | 4/1993 | Gross et al. | |
| 5,265,082 A | 11/1993 | Gniewek et al. | |
| 5,353,170 A | 10/1994 | Fung et al. | |
| 6,034,831 A | * 3/2000 | Dobbek | ................. 360/53 |
| 6,384,999 B1 | * 5/2002 | Schibilla | |
| 6,496,313 B1 | * 12/2002 | Haines | ................. 360/53 |

* cited by examiner

Primary Examiner—Alan T. Faber
(74) Attorney, Agent, or Firm—Merchant & Gould P.C.

(57) ABSTRACT

A host-transparent, performance-unaffecting, self-contained write authentication test (SWAT) is implemented in a disc drive to utilize periods of disc drive inactivity to self-verify data written to a disc in a disc drive and further record in the Self Monitoring Analysis & Reporting Technology (SMART) feature of the disc drive, various resultant metrics characterizing the operation of the disc drive during the data authentication. The disc drive maintains a list of recently received write commands, and after a period of inactivity from the host, optionally sorts and parses the list of recent write commands, executes reads from the disc of the data recently written, and records operational parameters characterizing failed data verification during the reads in the SMART feature.

11 Claims, 3 Drawing Sheets

SELF-CONTAINED DISC DRIVE WRITE AUTHENTICATION TEST

RELATED APPLICATIONS

This application claims priority of U.S. provisional application Serial No. 60/236,317, filed Sep. 28, 2000.

FIELD OF THE INVENTION

This application relates generally to data storage verification in a disc drive having logical sectors, and more particularly to a write authentication test designed to, while minimally affecting performance, automatically verify recently written logical sectors, and store resultant read metrics for future testing and diagnosing of the disc drive.

BACKGROUND OF THE INVENTION

Disc drives are data storage devices that store digital data in magnetic form on a rotating storage medium called a disc. Modern disc drives comprise one or more rigid discs that are coated with a magnetizable medium and mounted on the hub of a spindle motor for rotation at a constant high speed. Each surface of a disc is divided into several thousand tracks that are tightly-packed concentric circles similar in layout to the annual growth rings of a tree. The tracks are typically numbered starting from zero at the track located outermost the disc and increasing for tracks located closer to the center of the disc. Each track is further broken down into sectors and servo bursts. A sector is normally the smallest individually addressable unit of information stored in a disc drive and typically holds 512 bytes of information plus a few additional bytes for internal drive control and error detection and correction. This organization of data allows for easy access to any part of the discs. A servo burst is a particular magnetic signature on a track which facilitates positioning of heads over tracks.

Generally, each of the multiple discs in a disc drive has associated with it two heads (one adjacent the top surface of the disc, and another adjacent the bottom) for reading and writing data to a sector. A typical disc drive has two or three discs. This usually means there are four or six heads in a disc drive carried by a set of actuator arms. Data is accessed by moving the heads from the inner to outer part of the disc (and vice-versa) driven by an actuator assembly. The heads that access sectors on discs are locked together on the actuator assembly. For this reason, all the heads move in and out together and are always physically located at the same track number (e.g., it is impossible to have one head at track 0 and another at track 500). Because all the heads move together, each of the tracks on all discs is known as a cylinder for reasons that these tracks form a cylinder since they are equal-sized circles stacked one on top of the other in space. So, for example, if a disc drive has four discs, it would normally have eight heads, and a cylinder number 680 would be made up of a set of eight tracks, one per disc surface, at track number 680. Thus, for most purposes, there is not much difference between tracks and cylinders since a cylinder is basically a set of all tracks whereat all the heads are currently located.

One of the heads must first be positioned over the correct location of a sector on the disc in order to access (i.e., read or write) the sector. This requires the heads to move to the correct track and then wait for the correct sector to pass under the appropriate head. Moving the heads to the correct track is measured by seek time. A head seek in a disc drive occurs on the order of milliseconds. At this speed, and due to the nature of the construction, head seeks cause spike-like soundwaves. These waves are what cause the familiar 'clicking' sound of hard disc drives. The particular loudness and duration of a hard disc drive seek click is characterized by factors such as a differential equation steering mechanism used by the servo system, and the magnitude of the distance of the head displacement from the start to end point of the seek.

Once a seek has finished and while the disc rotates to a correct sector, the servo mechanism continuously interprets servo burst information from the track to ensure the head remains positioned correctly. Essentially, servo bursts, also known as servo wedges, aid in steering the head over the track. The time elapsed while waiting for a correct sector to pass under the appropriate head is measured by latency.

Seek time and latency are two very important disc drive performance measurements. Seek time measures the amount of time required for the heads to move between tracks. Generally, the amount of time to switch between two tracks depends on the distance between the tracks; however, the relationship is not linear due to a certain amount of overhead involved in track switching. Latency, on the other hand, measures the time that the disc drive must wait for the correct sector to come around to where one of the heads is waiting for it. At the time the appropriate head arrives at and begins to follow the correct track, the actual sector for read or write may be located elsewhere on the disc spinning around at high speed. This causes a latency delay since the servo system must wait for the correct sector to arrive under the head.

A seek time delay and a latency delay are normally expressed in milliseconds. In a computing system, a millisecond is an enormous amount of time when the system memory speed is measured in nanoseconds. For example, a 200 MHz processor can theoretically execute 200,000 instructions in a millisecond. Thus, cutting the seek time and/or latency delays result in significant performance improvement in a computing system, because the computing system can execute a significant number of instructions instead of waiting for movement of the heads to a track or waiting for a correct sector to pass under one of the heads.

Particularly, storing data in a contiguous block of sectors on a track in a disc drive reduces latency. For example, latency is relatively a minor factor for reading or writing a large contiguous block of data on a track since the latency will only occur once while waiting to access the first sector of data. On the other hand, latency is an important performance-limiting factor for reading or writing noncontiguous multiple data blocks on a track.

As with any data storage and retrieval, data integrity is critical. Oftentimes, for various reasons such as defective media, improper head positioning, extraneous particles between the head and media, or marginally functioning components, disc drives may record or read data incorrectly to or from the disc. For reasons such as predicting imminent disc drive failure, disc drive testing, and evolutionary disc drive improvement, it is valuable to characterize a disc drive's operating parameters; it is particularly useful to characterize unsuccessful reads and writes. To this end, the industry recognized Self Monitoring Analysis & Reporting Technology (SMART) feature was developed. SMART is essentially a self-contained disc drive monitoring system which measures, records, and analyzes various operating metrics of a disc drive. SMART has been used for such things as predicting failures and diagnosing failed disc drives.

As mentioned above, when a disc drive receives a read command from a host, it accesses the corresponding data from the disc, and before sending the data to the host, performs an error detection, and if necessary, error correction routine. This operation is necessary when data has either been incorrectly written to a disc, or incorrectly read from a disc, and is made possible through the use of error correction code data by which extra data is stored at the end of a sector and can be used in a mathematical formula to check and correct the data retrieved from a disc.

However, to date, no equivalent mechanism exists for checking and correcting data during a disc drive write. As a disc rotates under a head, the servo mechanism interprets servo burst information from the track on the media, and steers the head over the track. The user, or host data resides between servo bursts on a track, and therefore, while writing data to the disc, there is no on-the-fly assurance that the data was written in the correct location. Moreover, there is no assurance the head functioned correctly, there was no particle interference, nor that the media wasn't defective and not properly magnetized. For the most part, the data is in fact written correctly and in the correct location on the disc. However, for various reasons as listed above, this is not always the case. Accordingly there is a need for a mechanism which allows a disc drive to check the integrity of data written to a disc, while minimizing performance impact and excessive seek noise, and store resultant read metrics for future testing and diagnosing of a disc drive. The mechanism can be incorporated as a part of the SMART feature of disc drives.

SUMMARY OF THE INVENTION

Against this backdrop embodiments of the present invention have been developed. Embodiments of the present invention essentially comprise a system to authenticate correctly written disc drive data while minimally affecting the performance and loudness of a disc drive, and characterize and store read command metrics for future testing and diagnostic operations. That is, it transparently performs self-authentication of data written to a disc drive's disc, and stores information characterizing failed read commands for further reporting and analysis. Henceforth, an embodiment of the invention shall be referred to as Self-contained Write Authentication Test (SWAT).

There are basically two possible types of a successful read verification command which can be employed by SWAT. If a disc drive attempts to read a sector from the disc and interprets that the read data does not require error correction, or if the read data does require error correction and the error correction is completed successfully, the data can be considered valid. In this case, the host data is not actually confirmed to be the exact data that was originally written to the disc; rather, it indicates that the status of the data is considered satisfactory, and that the data is most likely correct. The probability that an error detection or error correction algorithm results in a successful status, but actually returns incorrect data is dictated by the nature of the error detection and correction scheme. As general practice in industry however, the probability of such an occurrence is negligible. The second type of a successful read verification is one in which the data read from the disc is actually compared to the data sent from the host sending the write command. In this case, an on-drive write buffer can retain write data until the read verification command has completed. This latter type of read verification requires more memory and computing bandwidth.

There is one preferred embodiment by which this can be achieved in a disc drive that is presently envisioned. However, other means will also become apparent to those skilled in the art upon reading the following description. Essentially, when a disc drive determines it has been inactive for a period of time, it will enter into a write authentication test mode. In this mode, the disc drive will automatically attempt to read back from the disc, a number, for example 40, of the most recently executed write commands. The disc drive is, in effect, verifying that the data was written to the disc correctly.

These and various other features as well as advantages that characterize the present invention will be apparent from a reading of the following detailed description and a review of the associated drawings.

DETAILED DESCRIPTION

Figure 1:
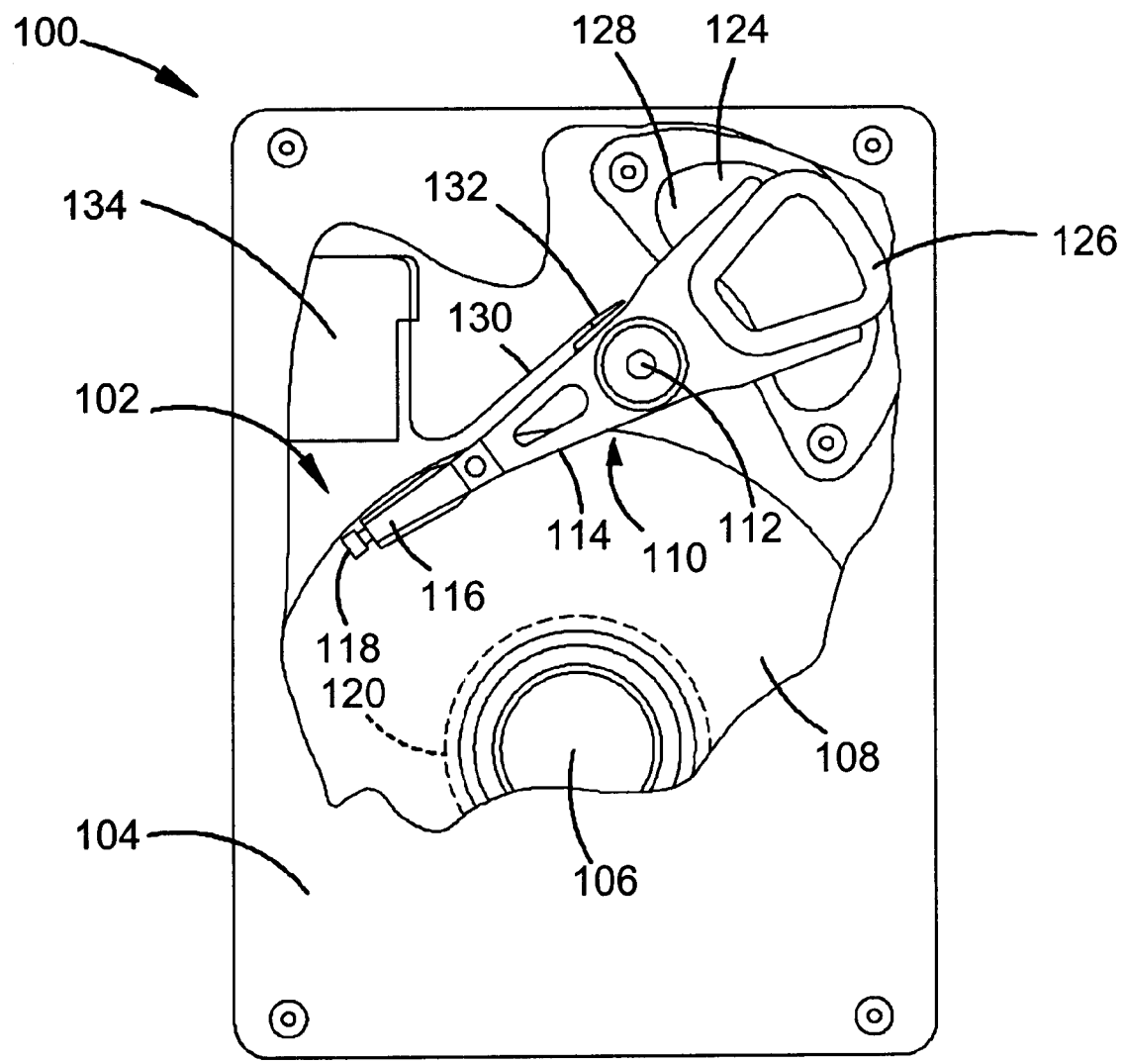
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are typically moved over park zones 120 near the inner diameter of the discs 108 when the spindle motor 106 is de-energized. The heads 118 can be secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly 130 includes a preamplifier 132 to which head wires (not shown) are connected; the head wires being routed along the actuator arms 114 and the flexures 116 to the heads 118. The preamplifier 132 typically includes circuitry for controlling the write currents applied to the heads 118 during a write operation and a preamplifier for amplifying read signals generated by the heads 118 during a read operation. The flex assembly 130 terminates at a flex bracket 134 for communication through the base deck 102 to a disc drive printed circuit board (not shown) mounted to the bottom side of the disc drive 100.

Figure 2:
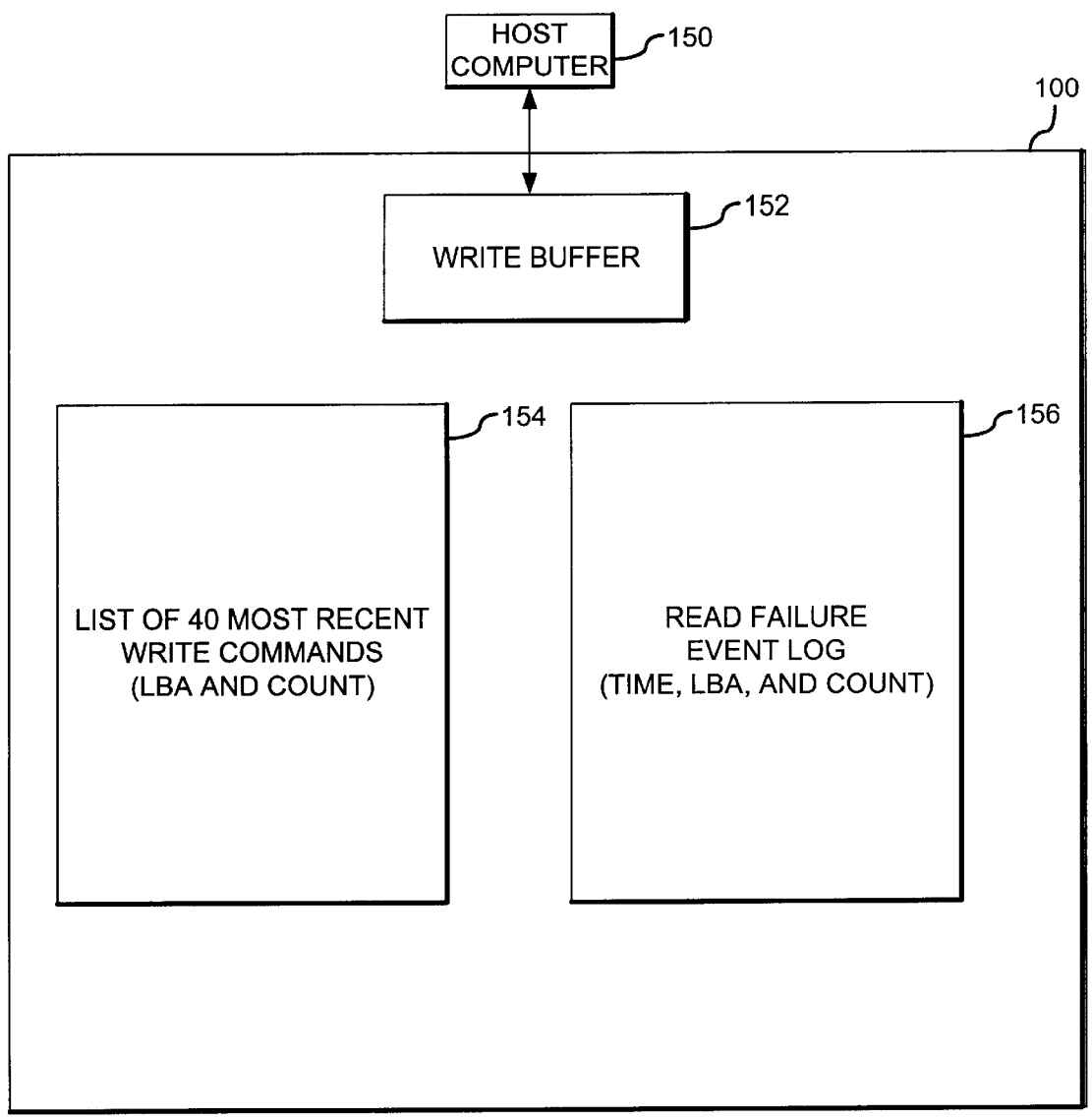
FIG. 2 is a simplified block diagram of a disc drive and its connection to the host computer system, and further illustrates the main components of the Self-Contained Write Authentication Test (SWAT) system in accordance with a preferred embodiment of the present invention.

Referring now to FIG. 2, shown therein is a block diagram of the disc drive 100 of FIG. 1, generally showing the vital components of the Self-Contained Write Authentication Test (SWAT) system. The disc drive 100 is shown in FIG. 2 to be operably connected to a host computer 150 in which the disc drive 100 is mounted in a conventional manner. A write buffer 152 contains write data sent from the host computer 150 to be written to the disc 108. The SWAT system also retains a list 154 of a set number of most recent write commands. This list 154 retains the sector number (LBA) and amount of data (count) which was transferred for each command. A read failure event log 156 retains a list of read commands that failed to successfully read data from the disc 108. The event log 156 stores the time of the failed read, and the LBA and count of the failed read.

Figure 3:
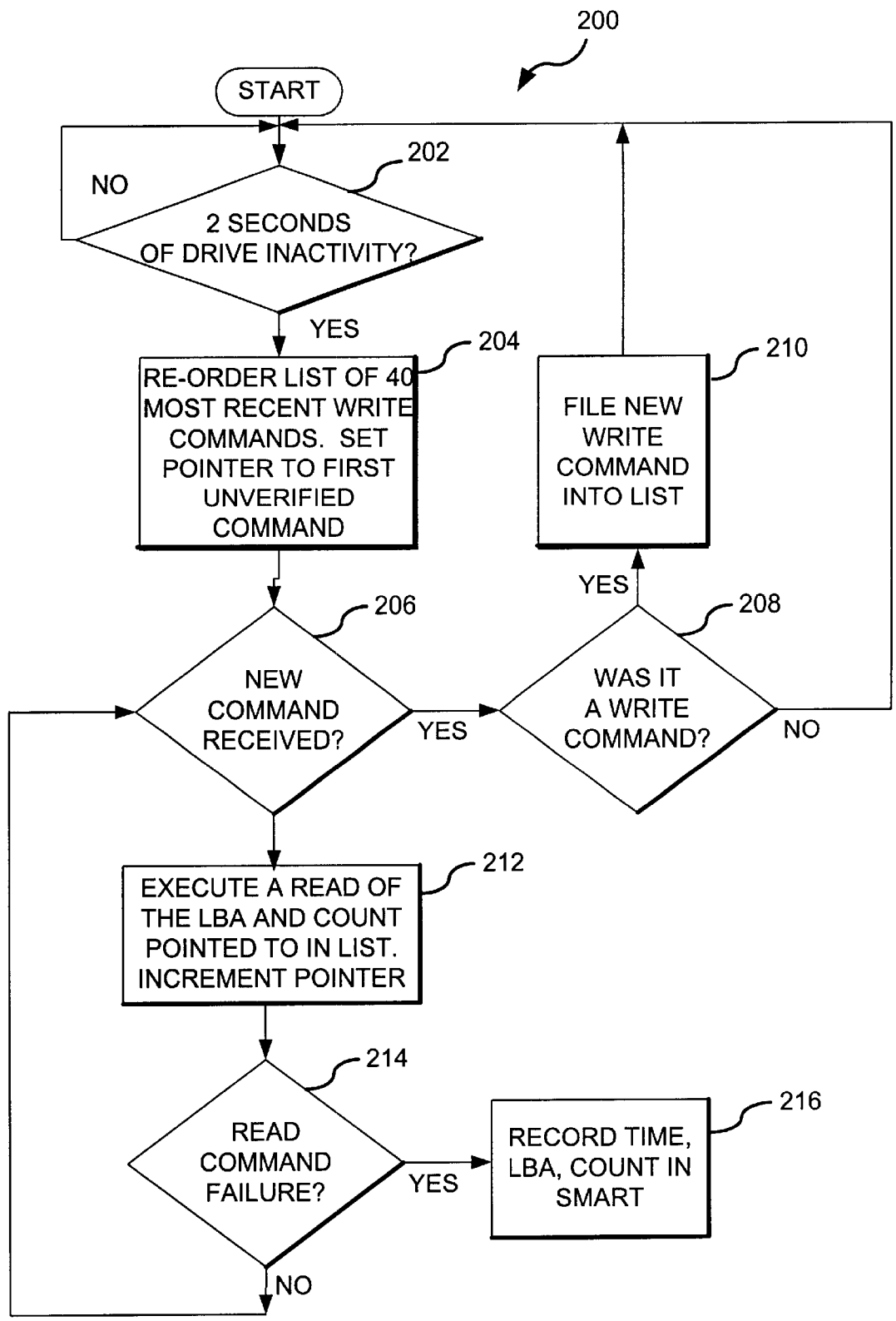
FIG. 3 is a SWAT flowchart illustrating the logical SWAT procedure in accordance with a preferred embodiment of the present invention.

FIG. 3 is a flow diagram of a preferred embodiment 200 of the logical SWAT system procedure in accordance with the present invention. The process begins in query operation 202. The servo controller checks to see if the disc drive 100 has been inactive for 2 seconds. If it has not been inactive for 2 seconds, the process continues to wait. If the disc drive 100 has been inactive for 2 seconds, control transfers to operation 204. In operation 204, the firmware reorders the current list of most recent write commands 154. This re-ordering is designed to achieve a balance of speed and quietness during the upcoming read commands. The firmware then initializes a pointer to point to the first read command to be executed, and transfers control to query operation 206. Here, the firmware checks to see if a new command has been sent from the host 150 to the disc drive 100. If a new command has been received, control transfers to query operation 208. If the command received was a write command, control transfers to operation 210. If the command was not a write command, control transfers to query operation 202. In operation 210, the new write command is filed into the command list 154, and the oldest command is removed from the command list 154.

If query operation 206 determines no new commands were received by the disc drive 100, control transfers to operation 212 where the disc drive 100 executes the read command currently pointed to in the write command list 154, and subsequently increments the pointer to the next read command in the list 154. Control then transfers to query operation 214. If the executed read command was unable to successfully read the data from the disc 108, control transfers to operation 216. In operation 216, the current time, LBA of the attempted read, and count of the attempted read are stored in the disc drive's 100 SMART system. If query operation 214 determines the read command completed successfully, control transfers to operation 206.

Essentially, the SWAT system 200 functions as follows. As commands are received by the disc drive 100, the drive servo controller firmware monitors and files write commands into a write command list 154. In a preferred embodiment, the write command list is a 40 entry, FIFO implementation of a linked list. Once the disc drive 100 has been idle for a period of time (2 seconds in a preferred embodiment), the write command list 154 is reordered. The ordering is specifically selected such that when the disc drive 100 enters the SWAT mode, it verifies written data in the most efficient and quiet manner possible. The drive 100 sequentially parses through the reordered list of recent write commands 154 and attempts to read the data back from the disc 108. If the drive 100 is unable to read any of the sectors recently written, an event detailing the time of failure, disc location of failure, and number of sectors attempted to be read is stored in the disc drive 100's SMART system. These metrics can be used by SMART to predict imminent drive 100 failure, or for testing during manufacture, or for diagnostic evaluation of an already failed drive.

In summary, the present invention may be viewed as a self-contained method for verifying the integrity of data written to a disc drive (such as 100) with a disc (such as 108) that maintains a list of recent write commands (such as 154), and records failure events in an event log (such as 156). The method (such as in operations 202 through 216) includes steps (a) filing new write commands (such as in operation 210) into the recent write commands list (such as 154), (b) waiting for a set period of drive inactivity (such as in operation 202), (c) reordering (such as in operation 204) the list of recent write commands (such as 154), (d) parsing (such as in operation 212) the reordered write command list (such as 154) and reading back data from the disc (such as 108) locations previously written according to the write command list (such as 154), and (e) filing error events (such as in operation 216) specifying time, location, and count into an event log (such as 156) for data unsuccessfully read from the disc (such as 108) locations previously written according to the write command list (such as 154).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the write authentication test while maintaining substantially the same functionality without departing from the scope and spirit of the present invention. In addition, although the preferred embodiment described herein is directed to a write authentication test for a disc drive system, it will be appreciated by those skilled in the art that the teachings of the present invention can be applied to other systems, like optical storage devices and tape data storage systems, without departing from the scope and spirit of the present invention.

What is claimed is:

1. In a disc drive having a data storage disc, an actuator for positioning a transducer over the data storage disc and a disc servo controller for communicating with a host computer and controlling positioning of the actuator for accessing data sectors in tracks on the data storage disc, a method for self-verifying the integrity of data recently written to the data storage disc, comprising steps of:

(a) storing new write commands in a recent write commands list;

(b) waiting for a period of drive inactivity;

(c) parsing the recent write commands list; and (d) reading back data from the disc locations previously written according to the recent write commands list.

2. The method according to claim 1 wherein the recent write commands list may be optionally sorted prior to step (c).

3. The method according to claim 1 further comprising a step of:

(e) storing read error events specifying a time of each read error, a location on the disc of each read error, and a sector count of each read error into an event log for data unsuccessfully read from the disc locations previously written according to the write commands list.

4. The method according to claim 1 further comprising a step of:

(e) comparing data read from the disc to previously received write command data in a write buffer in the disc drive controller.

5. The method according to claim 1 further comprising steps of:

(e) storing read error events specifying a time of each read error, a location on the disc of each read error, and a sector count of each read error into an event log for data unsuccessfully read from the disc locations previously written according to the write commands list; and (f) comparing data read from the disc to previously received write command data in a write buffer in the disc drive controller.

6. A disc drive having a data storage disc, an actuator for positioning a transducer over the data storage disc and a disc servo controller for communicating with a host computer, controlling position of the actuator and controlling access to data sectors in tracks on the data storage disc, the disc drive comprising:

an interface;

a read/write channel between the interface and the transducer;

a formatter between the interface and the read/write channel for timing when data is transferred between the interface and the read/write channel; and a Self-contained Write Allocation Test (SWAT) system having a list of a number of recent write commands for verifying recently data recently written to the disc.

7. The disc drive according to claim 6 wherein the list of recent write commands is sortable.

8. The disc drive according to claim 6 wherein the SWAT system has an event log for storing read error events specifying a time of read error, a location on the disc of read error, and a sector count of read error into the event log for data unsuccessfully read from the disc.

9. The disc drive according to claim 8 wherein the SWAT system is adaptively incorporated into a Self Monitoring Analysis & Reporting Technology feature.

10. The disc drive according to claim 8 wherein the time, location, and count read error event log entries are retrievable from the disc drive by a host computer.

11. A disc drive having a data storage disc, an actuator for positioning a transducer over the data storage disc and a disc controller for communicating with a host computer, controlling position of the actuator and controlling access to data sectors in tracks on the data storage disc, the disc drive comprising:

a formatter between the host computer and the transducer for timing when data is transferred between the host and the transducer; and means for automatically self-verifying that data on the storage disc is readable.

* * * * *

UNITED STATES PATENT AND TRADEMARK OFFICE
CERTIFICATE OF CORRECTION

PATENT NO.    : 6,650,492 B2
DATED         : November 18, 2003
INVENTOR(S)   : Lenny et al.

It is certified that error appears in the above-identified patent and that said Letters Patent is hereby corrected as shown below:

<u>Title page,</u>
Item [*] Notice, "181 days" should read -- 301 days --.

Signed and Sealed this

Twenty-second Day of June, 2004

JON W. DUDAS
*Acting Director of the United States Patent and Trademark Office*